United States Patent
Tornquist et al.

(10) Patent No.: US 7,086,137 B2
(45) Date of Patent: Aug. 8, 2006

(54) ROTOR ASSEMBLY METHOD

(75) Inventors: Gerald E. Tornquist, Tucson, AZ (US); James D. Lengel, Oro Valley, AZ (US); Raymond W. Borden, Farmingdale, NJ (US); Kieran P. J. Doherty, Oro Valley, AZ (US); Ming Xu, Tucson, AZ (US); WuenFar L. Chen, Tucson, AZ (US); Gregor J. S. McDowall, Tucson, AZ (US)

(73) Assignee: Honeywell International, Inc., Morristown, NJ (US)

( * ) Notice: Subject to any disclaimer, the term of this patent is extended or adjusted under 35 U.S.C. 154(b) by 90 days.

(21) Appl. No.: 10/794,470

(22) Filed: Mar. 5, 2004

(65) Prior Publication Data

US 2004/0168301 A1 Sep. 2, 2004

Related U.S. Application Data

(62) Division of application No. 09/948,864, filed on Sep. 7, 2001, now Pat. No. 6,753,637.

(51) Int. Cl.
*H02K 15/02* (2006.01)
*H02K 15/10* (2006.01)

(52) U.S. Cl. .............................. 29/598; 29/596; 29/597; 29/606; 310/211; 310/258; 310/270; 310/271; 363/144

(58) Field of Classification Search .................. 29/598, 29/596, 597, 606; 310/211, 258, 270, 271; 363/144
See application file for complete search history.

(56) References Cited

U.S. PATENT DOCUMENTS

| 3,558,950 | A | * | 1/1971 | Raybould | .................. 310/270 |
| 5,955,811 | A | * | 9/1999 | Chiba et al. | ................. 310/211 |
| 6,150,747 | A | * | 11/2000 | Smith et al. | ................. 310/258 |
| 6,777,839 | B1 | * | 8/2004 | Casey et al. | .............. 310/68 D |

* cited by examiner

*Primary Examiner*—A. Dexter Tugbang
*Assistant Examiner*—Tim Phan
(74) *Attorney, Agent, or Firm*—Ingrassia Fisher & Lorenz

(57) ABSTRACT

A rotor and a method of constructing a rotor are disclosed. The rotor includes a hub that is capable of being supported by a shaft that extends along an axis, a plurality of laminations, and a plurality of wire windings supported by the plurality of laminations. The hub includes an inner structure configured to support the hub relative to the shaft, an outer structure that supports the laminations, and an intermediate structure that is coupled to the inner and outer structures and supports the inner and outer structures relative to one another.

2 Claims, 7 Drawing Sheets

ROTOR ASSEMBLY METHOD

CROSS REFERENCE TO RELATED APPLICATION

This application is a divisional of Ser. No. 09/948,864 filed on Sep. 7, 2001, now U.S. Pat. No. 6,753,637.

FIELD OF THE INVENTION

The present invention relates to high speed generators and, more particularly, to the structure of the rotors of such generators.

BACKGROUND OF THE INVENTION

Generator systems that are installed in aircraft may include three separate brushless generators, namely, a permanent magnet generator (PMG), an exciter, and a main generator. The PMG includes permanent magnets on its rotor. When the PMG rotates, AC currents are induced in stator windings of the PMG. These AC currents are typically fed to a regulator or a control device, which in turn outputs a DC current. This DC current next is provided to stator windings of the exciter. As the rotor of the exciter rotates, three phases of AC current are typically induced in the rotor windings. Rectifier circuits that rotate with the rotor of the exciter rectify this three-phase AC current, and the resulting DC currents are provided to the rotor windings of the main generator. Finally, as the rotor of the main generator rotates, three phases of AC current are typically induced in its stator windings, and this three-phase AC output can then be provided to a load such as, for example, electrical aircraft systems.

Among the important components in such generator systems are the rotors of the exciters. Conventional exciter rotors are formed from multiple laminations that are thin plates that are stacked axially along the generator shaft. The rotors often have many (e.g., more than eight) poles, and also support the rectifier circuits that convert the AC power generated in the rotor windings into the DC power that is to be provided to the main generator rotor.

Such conventional exciter rotors have several limitations. Because the generators installed in aircraft will often be variable frequency generators that rotate in the speed range of 12,000 rpm to 24,000 rpm, large centrifugal forces are imposed upon the rotors of the generators. Because the structure of the rotor includes multiple laminations, and because the laminations often are made from materials that are limited in their strength, imbalances in the rotor can occur when changes or shifts in the laminations affect the relative alignment of the laminations with one another or with respect to the generator shaft. Additional imbalances can occur when shifting or other changes in the positioning of the laminations affect the positioning of the many wire windings or rectifier circuits being supported by the laminations. Such imbalances can create inefficiencies in the operation of the generators or risk potential failures.

Additionally, the use of laminations in the exciter rotors makes it difficult to accurately and consistently manufacture such rotors. Slight variations in the thicknesses of the laminations of the exciter rotor can make it difficult to predictably manufacture exciter rotors having a given overall axial thickness. Further, the complicated shape of the laminations, with their many radially protruding pole extensions and deep radial cut-outs, often renders it difficult to manufacture and assemble the laminations.

Hence, there is a need for a new exciter rotor assembly that is reliable, robust and can be easily manufactured within tolerances both in terms of the shape of the outer perimeter of the rotor and the axial thickness of the rotor. Additionally, there is a need for a new exciter rotor assembly that is capable of maintaining proper balance when operating at high speeds even though it includes multiple laminations and supports many wire windings and rectifier circuits.

SUMMARY OF THE INVENTION

The present inventors have recognized that a new exciter rotor assembly can be developed that includes a hub that is supported by the generator shaft and in turn supports narrow ring-type laminations around its outer perimeter. The laminations are shrunk fit onto the hub, which is made from a strong material, is carefully manufactured to have a particular axial thickness, and in turn is shrunk fit onto the generator shaft. By incorporating such a hub in between the narrow ring-type laminations and the generator shaft, the radial width of the laminations is significantly reduced and the above-described problems associated with the manufacture and use of the laminations are alleviated.

In particular, the present invention relates to a rotor that includes a hub configured to be supported by a shaft that extends along an axis, a plurality of laminations, and a plurality of wire windings supported by the plurality of laminations. The hub includes an inner structure configured to support the hub relative to the shaft, an outer structure, and an intermediate structure that is coupled to the inner and outer structures and supports the inner and outer structures relative to one another. The plurality of laminations are supported by the outer structure.

The present invention further relates to a generator that includes a stator, a shaft, and a rotor supported by the shaft. The rotor includes a plurality of laminations, a plurality of wire windings wrapped around the plurality of laminations, and a means for supporting the laminations relative to the shaft. The means for supporting has a first radial width extending from the shaft to the laminations that is larger than a second radial width of the laminations that extends from the means for supporting to an outer circumference of the rotor.

The present invention also relates to a hub for implementation in a high-speed generator rotor, where the hub includes an inner structure configured to support the hub relative to a shaft, an outer structure configured to support a plurality of laminations, and an intermediate structure that is coupled to the inner and outer structures and supports the inner and outer structures relative to one another. The intermediate structure defines a plurality of cavities within the hub.

The present invention additionally relates to a method of constructing a rotor. The method includes providing a hub having an outer structure with a cylindrical support surface and a retaining ring, an inner structure forming a cylindrical cavity, and an intermediate structure coupled to the inner and outer structures and configured to support the inner and outer structures relative to one another. The method further includes positioning a plurality of ring-type laminations and a pair of insulating rings onto the cylindrical support surface. A first of the pair of insulating rings is positioned on a first side of the plurality of laminations and a second of the pair of insulating rings is positioned on a second side of the plurality of laminations. The laminations and insulating rings are positioned so that the first of the pair of insulating rings abuts the retaining ring. The method additionally includes shrink-fitting the ring-type laminations and insulating rings onto the cylindrical support surface, positioning a balancing ring onto the cylindrical supports surface so that the balancing ring abuts the second of the pair of insulating rings, shrink-fitting the balancing ring onto the cylindrical support surface, and wrapping a plurality of wire windings onto the laminations.

Other features and advantages of the invention will become apparent from the following detailed description, taken in conjunction with the accompanying drawings, which illustrate, by way of example, the principles of the invention.

DETAILED DESCRIPTION OF THE INVENTION

Figure 1:
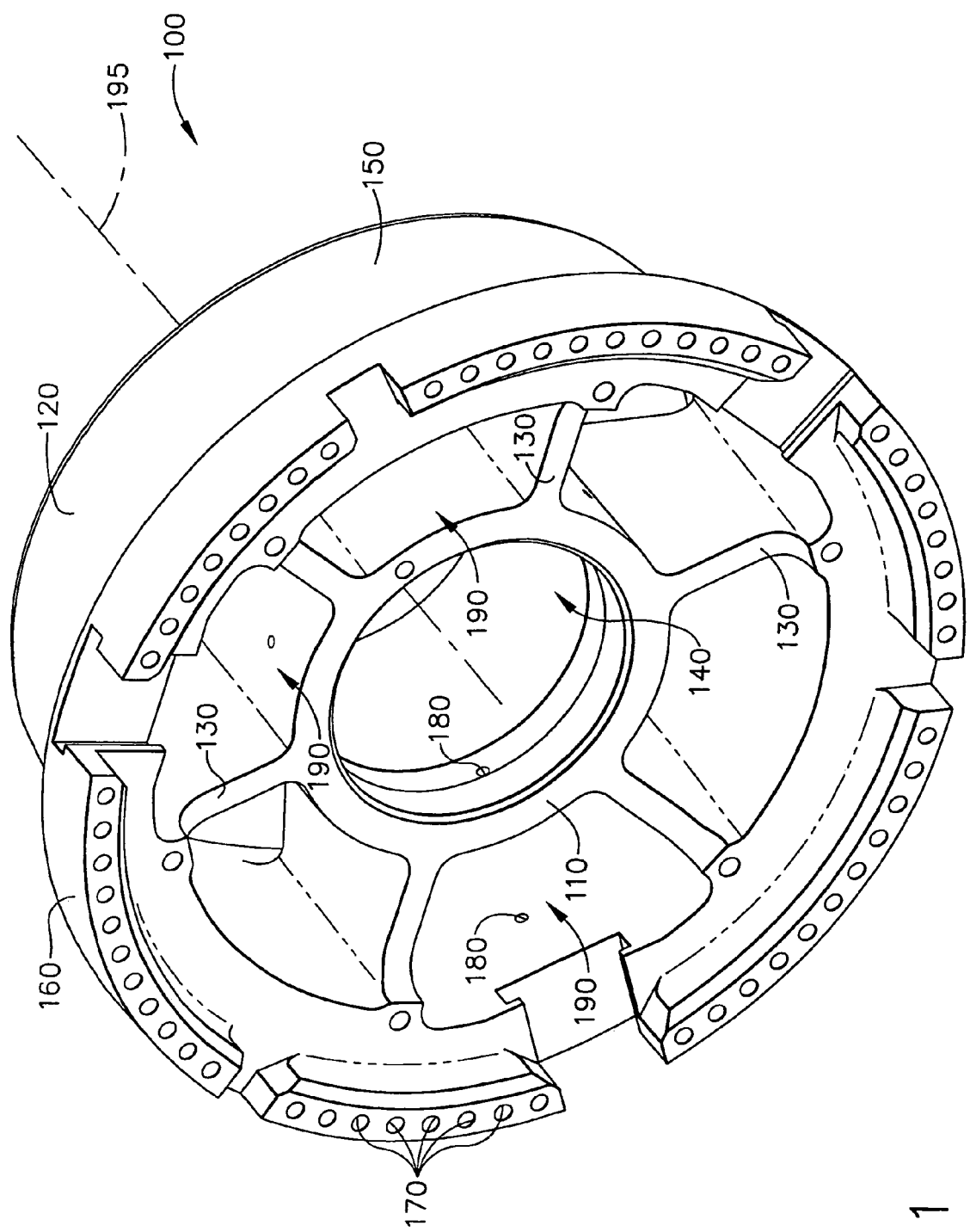
FIG. 1 is a perspective view of a hub capable of being employed in an exciter rotor.

Referring to FIG. 1, a hub 100 is shown that provides the main support structure of an exciter rotor in accordance with one embodiment of the present invention. The hub 100 includes an inner cylindrical structure 110 and an outer cylindrical structure 120 that are coupled to one another by way of six spokes 130. The inner cylindrical structure 110 in particular defines a cylindrical internal cavity 140 through which a generator shaft (see FIG. 6) protrudes when a complete generator assembly (see FIG. 7) is assembled. The inner cylindrical structure 110, outer cylindrical structure 120 and spokes 130 define multiple internal cavities 190. The outer cylindrical structure 120 includes both a cylindrical support surface 150 and a retaining rim 160. As will be discussed further with respect to FIG. 2, the support surface 150 supports the laminations and wire windings of the exciter rotor. The retaining rim 160 includes multiple holes 170, which can be filled with material during the process of assembling the generator assembly, in order to achieve proper balance of the exciter rotor. Additionally, the inner cylindrical structure 110 and the outer cylindrical structure 120 each include holes 180 through which oil or other lubricant/coolant can pass from the cylindrical internal cavity 140 (and the generator shaft) into the internal cavities 190.

The hub 100 is manufactured out of a high strength material such as steel, titanium or high strength aluminum, or any of a number of other high strength materials. The hub 100 consequently is about twice as strong as a conventional core made up of laminations. The hub 100 is carefully manufactured to have a particular axial thickness as measured along a central axis 195, to guarantee that the exciter rotor will properly fit within the generator assembly and be properly balanced. In one embodiment, one or more of the cylindrical structures 110, 120 and the spokes 130 are manufactured to have axial thicknesses within a tolerance of three-thousandths of an inch. Although six spokes 130 are shown coupling the inner cylindrical structure 110 to the outer cylindrical structure 120, in alternate embodiments, a lesser or greater number of spokes can be employed. Indeed, in certain embodiments, some or all of the internal cavities 190 can be entirely solid and filled in with material, although preferably the cavities are empty to reduce the overall weight of the exciter rotor. To operate properly as a hub, the hub 100 need only have an outer surface such as the cylindrical support surface 150 to support the laminations and rotor windings, and the cylindrical internal cavity 140 to allow the hub to be fitted onto a shaft. Further, in certain embodiments, the shaft (or at least a portion of the shaft) can be formed integrally as one part with the hub.

Figure 2:
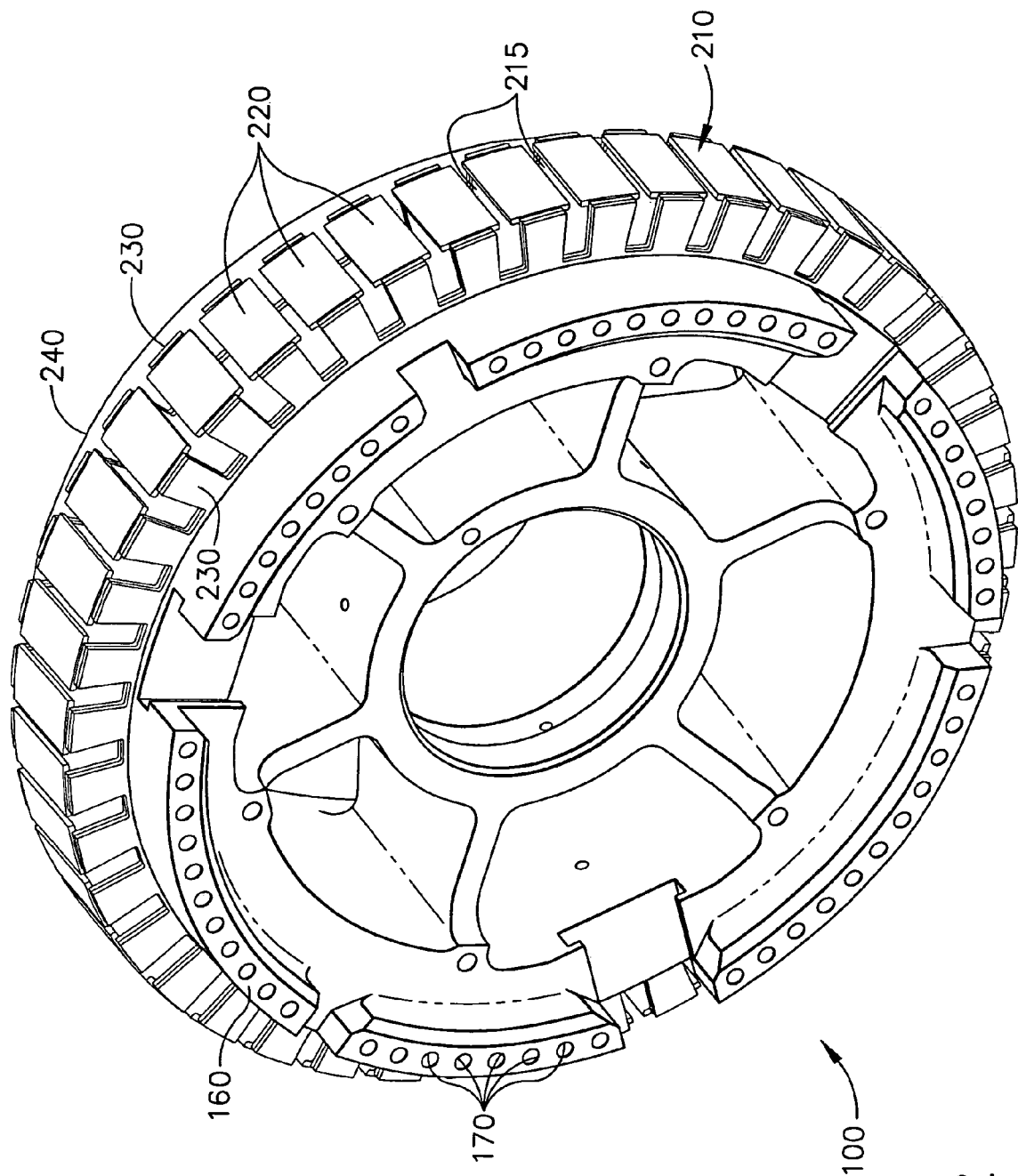
FIG. 2 is a perspective view of the hub of FIG. 1 shown supporting ring-type laminations and a balance ring.

Turning to FIG. 2, the hub 100 of FIG. 1 is shown to be supporting additional components of an exciter rotor. In particular, the hub 100 is supporting a balancing ring 240 and a set of multiple ring-type laminations 210 that have been shrunk fit onto the cylindrical support surface 150. The ring-type laminations 210 have cut-outs 215 extending radially-inward from the outer circumferences of the laminations such that the laminations have teeth 220 protruding outward toward the circumferences of the laminations. The laminations 210 typically are made from a conductive material that is less strong than that of the hub 100. In addition to the set of laminations 210, the hub 100 additionally supports a pair of insulating rings 230 that are positioned on opposite sides, axially speaking, of the set of laminations. The insulating rings 230 also include cut-outs and teeth, such that the cut-outs and teeth of the insulating rings and the laminations 210 are respectively lined up.

During assembly of the exciter rotor, the insulating rings 230 and laminations 210 are slipped onto the cylindrical support surface 150 of the hub 100 until the set of laminations and insulating rings abut the retaining rim 160 (specifically, one of the insulating rings 230 abuts the retaining rim 160). The laminations 210 and insulating rings 230 are then shrunk fit onto the support surface 150. Then, the balancing ring 240 is slipped on behind the laminations 210 and insulating rings 230 until it abuts the laminations and insulating rings (specifically, the balancing ring 240 abuts the other of the insulating rings 230). The balancing ring 240 is then also shrunk fit onto the support surface 150 of the hub 100. The balancing ring 240 has at least two purposes, the first being to prevent movement of the laminations 210 and the insulating rings 230 away from the retaining rim 160, and the second being to axially balance the retaining rim 160. The balancing ring 240 can also have holes 245 (see FIG. 4) that parallel the holes 170 of the retaining rim 160 and can be filled with material, in order to balance the exciter rotor.

Figure 3:
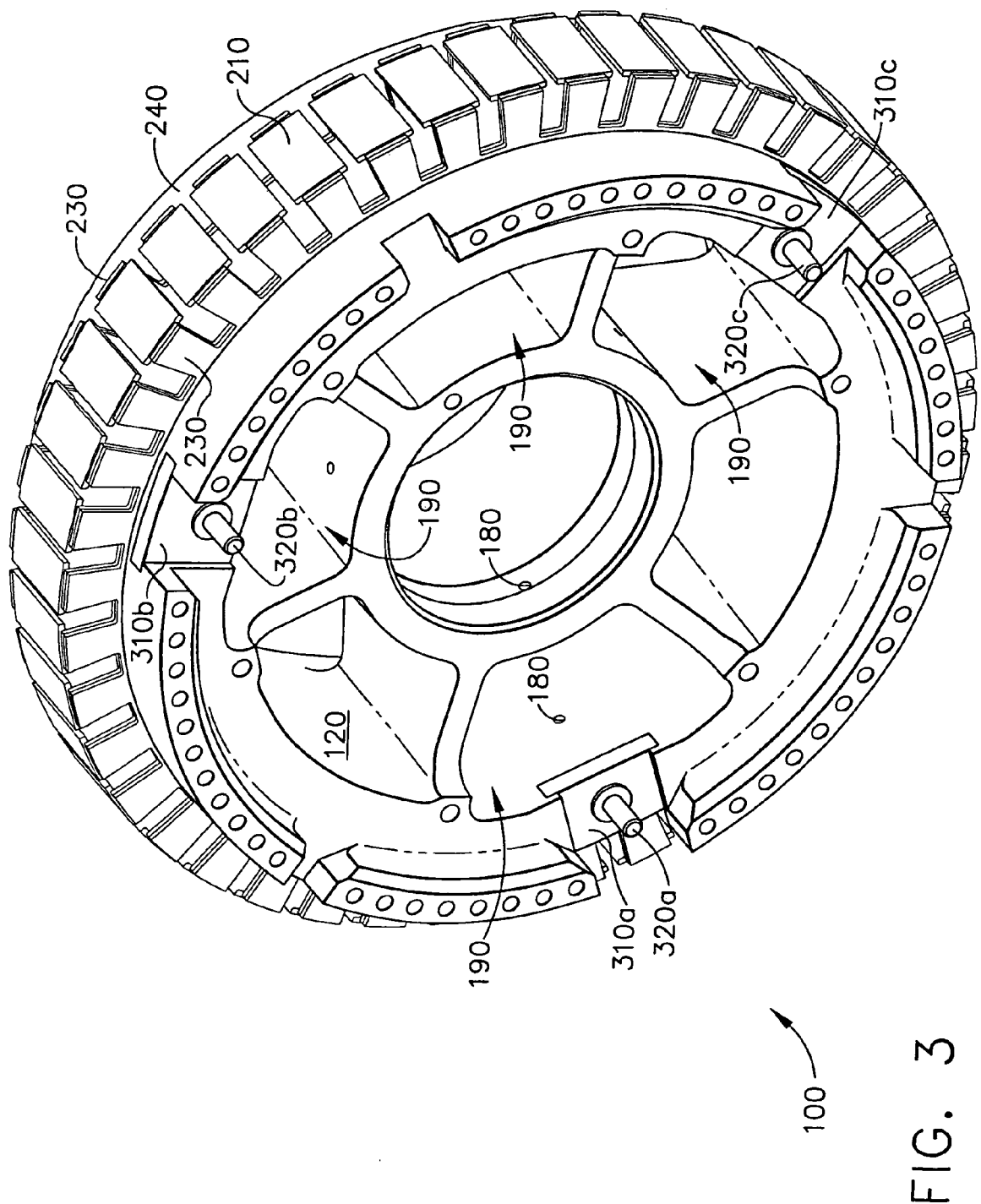
FIG. 3 is a perspective view of the hub of FIG. 2 shown to further include contacts onto which rectifier circuits can be affixed.

Turning to FIG. 3, the hub 100 is shown supporting the laminations 210, insulating rings 230 and balancing ring 240 and, in addition is shown to include three contact pads 310a–c and bolts 320a–c. Terminals from rectifier circuits fit around the bolts 320a–c and are tightened onto the pads 310a–c by way of nuts (see FIG. 6). When so attached to the hub 100, the rectifier circuits extend through three of the cavities 190, and are positioned within the cavities proximate the outer cylindrical structure 120 such that lubricant/coolant is directed toward the rectifier circuits out of holes 180 (particularly the holes in the outer cylindrical structure 120). In alternate embodiments, the rectifier circuits can be positioned in other ways onto the hub 100 or other elements of the exciter rotor, and need not be affixed to pads 310a–c or otherwise. Indeed, in certain embodiments, the hub 100 does not include the pads 310a–c and bolts 320a–c.

Figure 4:
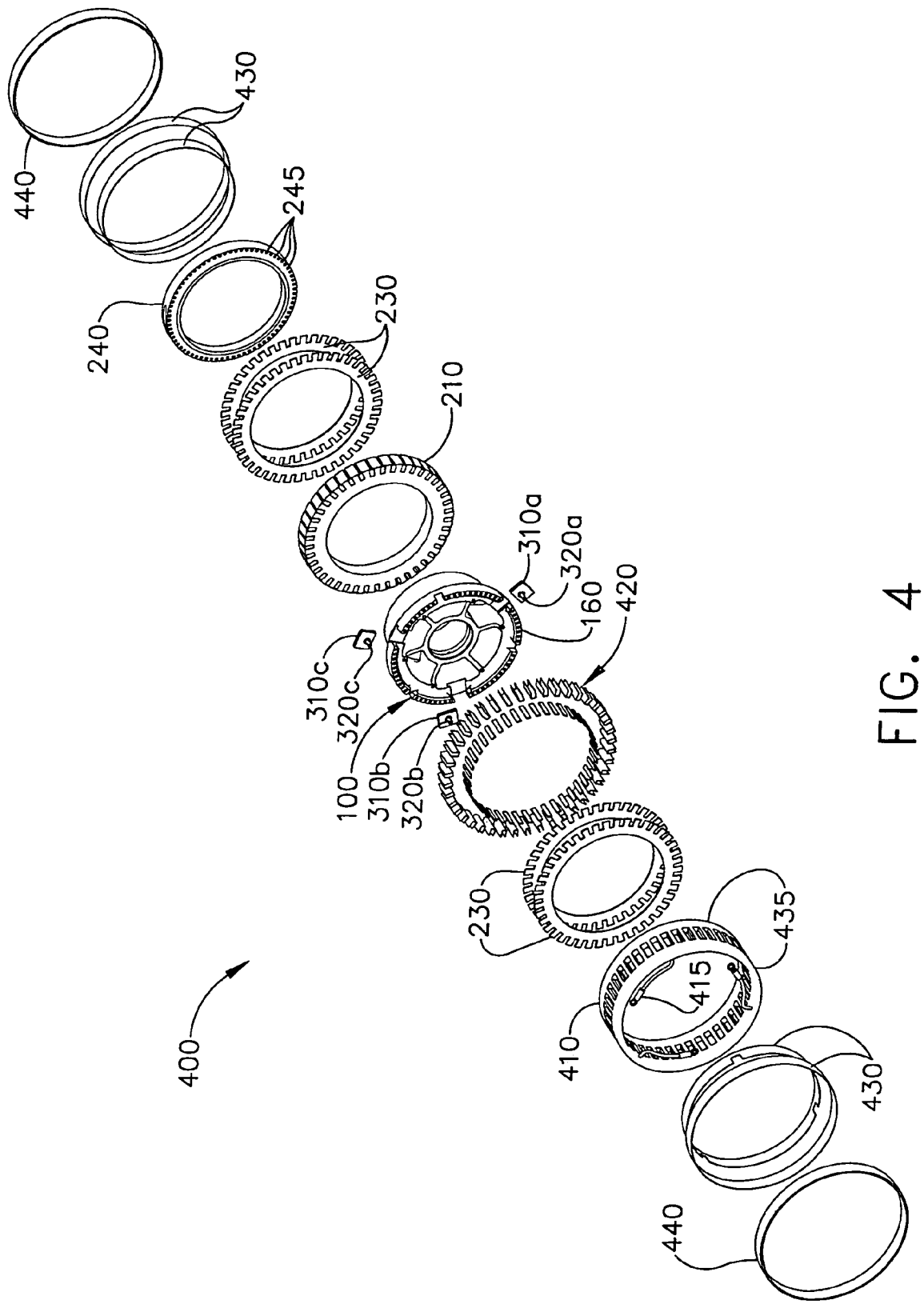
FIG. 4 is a perspective, exploded view of an exciter rotor employing the hub of FIG. 3 along with additional components.

Referring to FIG. 4, all of the components of an exemplary exciter rotor 400 that includes the hub 100 are shown in an exploded view. Specifically, the exciter rotor 400 includes the ring-type laminations 210, the insulating rings 230, and the balancing ring 240. Additionally shown are the pads 310a–c and the bolts 320a–c. In addition, the exciter rotor 400 includes wire windings 410, which fit around the teeth 220 of the laminations 210, as well as slot insulation 420, which fits within the cut-outs 215 in between the teeth of the laminations and insulates the wire windings from the laminations. The wire windings 410 include end wire terminals 415 by which the windings are connected to the bolts 320a–c. Further, two sets of two insulating bands 430 are shown, which respectively loop around the retaining rim 160 and the balancing ring 240. Specifically, the smaller band of each respective set wraps directly over the retaining rim 160 and the balancing ring 240, respectively, while the larger band of each set wraps over corresponding end turns 435 of the wire windings 410 that are respectively wrapped over the retaining rim and balancing ring. Finally, two coil restraint rings 440 are shown, which respectively fit over the respective sets of insulating rings 430. The coil restraint rings 440 can be made from any one of a number of materials that are able to assist in holding the end turns 435 of the wire windings 410 in position despite the high centrifugal forces experienced by the exciter rotor 400 during operation. In one embodiment, the coil restraint rings 440 are made from Inco 718 material.

Figure 5:
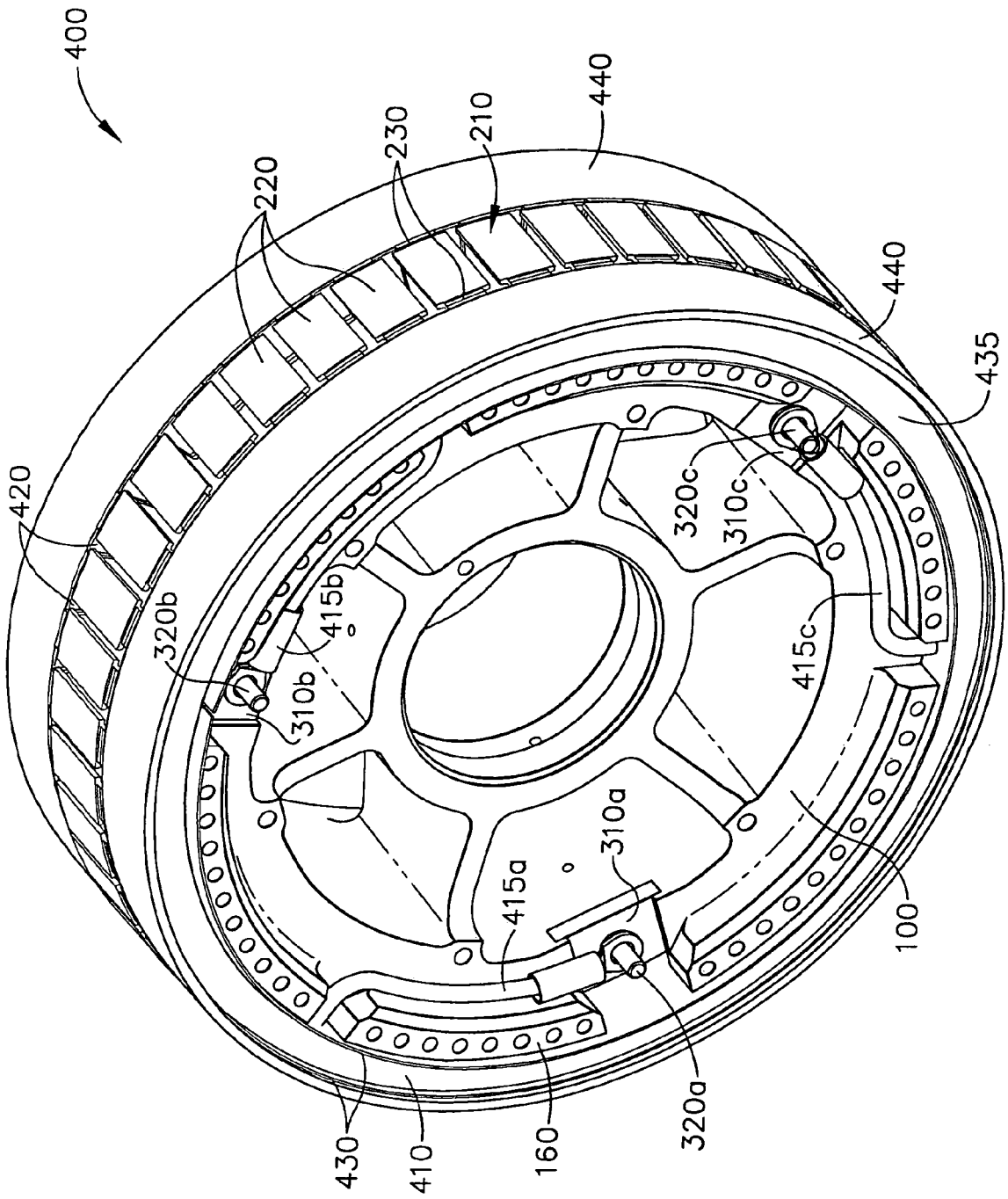
FIG. 5 is a perspective unexploded view of the exciter rotor of FIG. 4.

Referring to FIG. 5, the exciter rotor 400 including all of the components of FIG. 4 is shown in its completely-assembled form. In particular, in this perspective view, the end turns 435 of the rotor windings 410 are shown to be supported by the retaining rim 160, and the end wire terminals 415a–c are shown to be respectively coupled to the bolts 320a–c. Also shown in FIG. 5 is one of the sets of two insulating rings 430 that respectively are positioned above and under the end turns 435 of the rotor windings 430 around the retaining rim 160, as well as both of the coil restraint rings 440. Additionally, the teeth 220 of the laminations 210 and the insulating rings 230 are visible, as are portions of the slot insulation 420 that are set into the cut-outs 215 above the wire windings 410.

Given these components, the exciter rotor 400 can be assembled as follows. First, the set of laminations 210 along with the insulating rings 230 are slipped onto the rotor hub 100 (up to the restraining rim 160) and shrunk fit onto the hub. Next, the balancing ring 240 is slipped onto the hub 100 to abut the set of laminations/insulating rings, and shrunk fit onto the hub 100. Then, the contact pads 310a–c and bolts 320a–c are attached to the hub 100. Next, portions of the slot insulation 420 are placed within the cut-outs 215 of the laminations 210 and insulating rings 230. Further, one of the insulating bands 430 is positioned around the retaining rim 160 and another of the insulating bands is positioned around the balancing ring 240. Next, the wire windings 410 are wound onto the teeth 220 of the laminations 210 and insulating rings 230. The end turns 435 cover the insulating bands 430 that were earlier positioned onto the assembly. At this time, the end wire terminals 415a–c can be affixed to the bolts 320a–c, although this operation can be performed at a later time as well. Next, additional insulating bands 430 are positioned over the end turns 435 of the wire windings 410 and additional portions of slot insulation 420 are affixed onto the windings near the tops of the cut-outs 215 along the outer circumference of the rotor. Finally, the coil restraint rings 440 are positioned onto the rotor 400.

Figure 6:
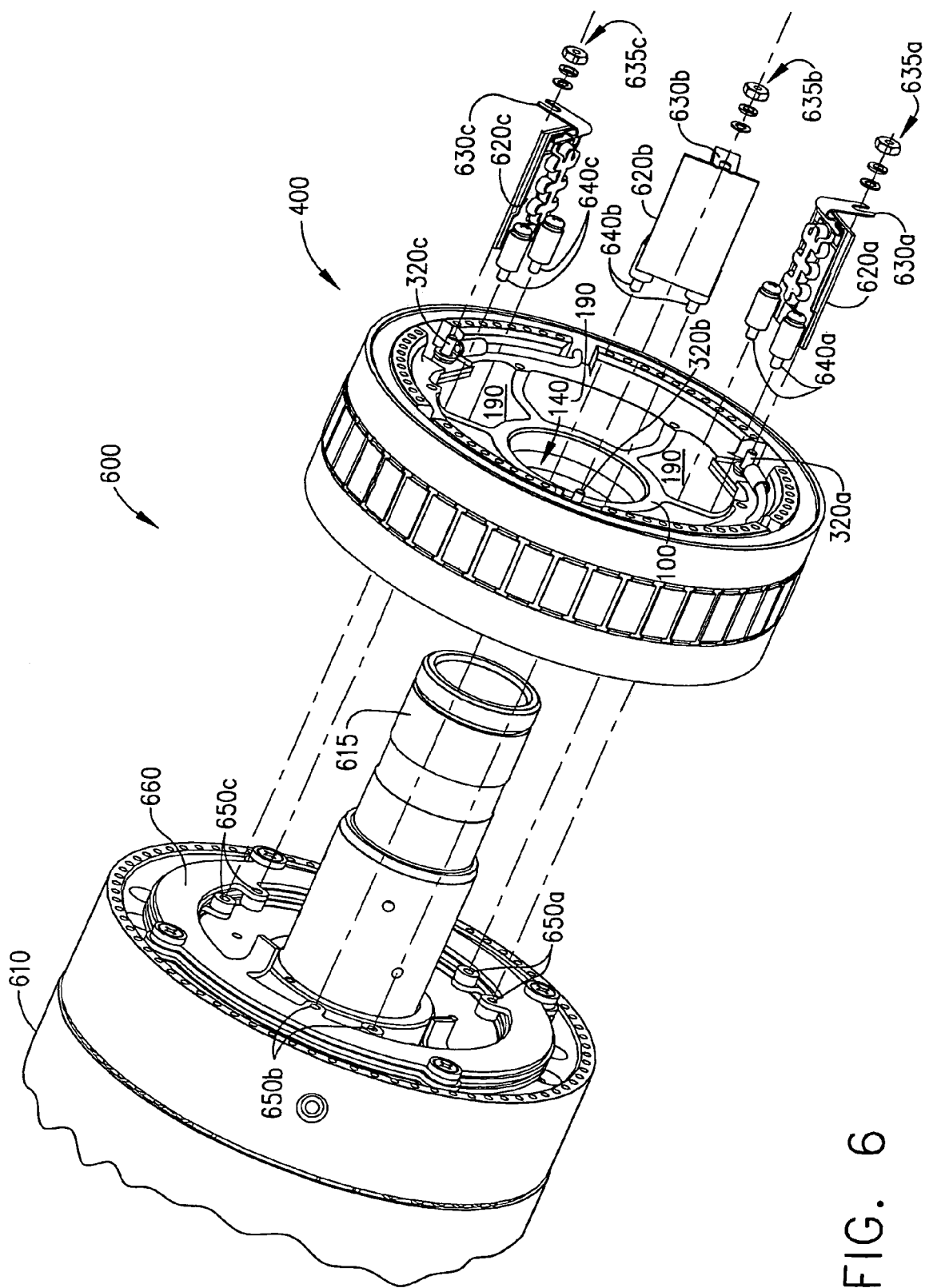
FIG. 6 is a perspective, exploded view (shown in cut-away) of the exciter rotor of FIG. 5, rectifier circuits, and a rotor of a main generator.
Figure 7:
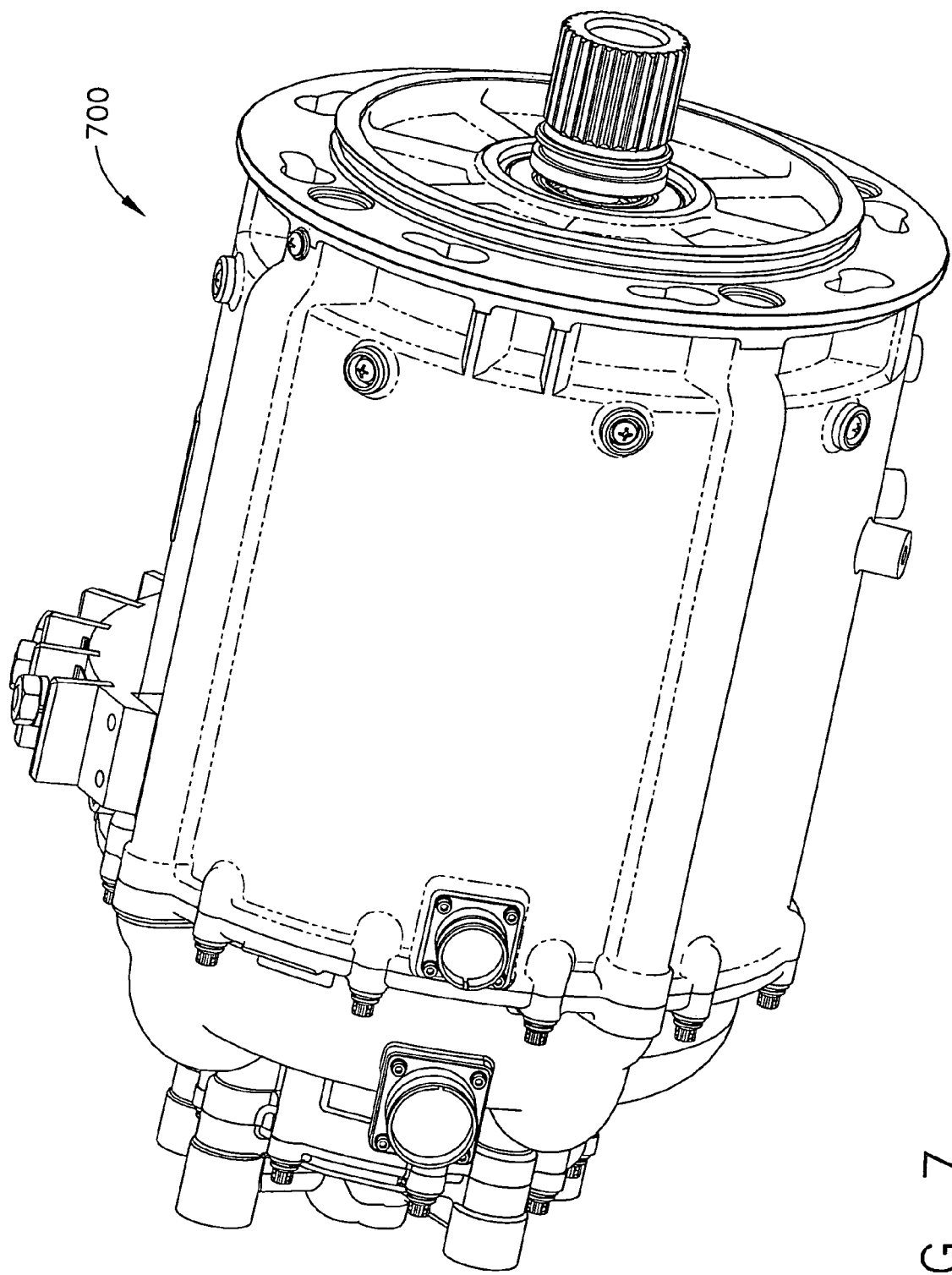
FIG. 7 is a perspective view of a generator assembly employing the exciter rotor and main generator rotor of FIG. 6.

Turning to FIG. 6, an exploded, perspective view of a rotor assembly 600 of a generator assembly (see FIG. 7), including both the exciter rotor 400 and a main generator rotor 610 is shown. During assembly of the rotor assembly 600, the exciter rotor 400 is positioned onto a shaft 615 of the main generator rotor 610, and then shrunk fit onto that shaft. Also, during assembly, three rectifier circuits 620a–c are positioned onto the exciter rotor 400 for converting AC power from the windings of the exciter rotor into DC power to be provided to the main generator rotor 610. Specifically, each of the rectifier circuits 620a–c includes a respective connector 630a–c that fits onto the respective bolt 320a–c of the exciter rotor 400, and is then fastened to that respective bolt by way of a respective fastening device 635a–c (e.g., nuts or other fastening devices). The rectifier circuits 620a–c then extend axially through the cavities 190 of the hub 100. Finally, terminals 640a–c are respectively designed to be coupled to corresponding terminals 650a–c of bus rings 660 on the main generator rotor 610 (terminals 650a are not shown due to the presence of the shaft 615). Thus, upon assembly, the exciter rotor 400 and the main generator rotor 610 are coupled together to form the single rotor assembly 600. This rotor assembly 600 can be implemented within the overall generator assembly 700 shown in FIG. 7.

The design of the exciter rotor 400, and particularly the design of the hub 100, provide the exciter rotor with certain advantages relative to conventional embodiments of exciter rotors. In particular, because the hub 100 extends most of the radial distance from the shaft 615 to the wire windings 410, the laminations 210 need only have sufficient radial width to be able to provide the teeth 220 around which the wire windings are wrapped and the cut-outs 215 into which the wire windings are positioned. Thus, the laminations 210 no longer constitute the primary structural element of the exciter rotor, but rather the hub 100, which is stronger than the laminations, constitutes the primary structural component of the exciter rotor. Consequently, all of the limitations associated with large laminations, including structural weakness, relative shifting of laminations with respect to one another and with respect to other elements of the generator assembly including the shaft, and imbalance of the exciter rotor due to relative movements of the laminations or movement of the wires and rectifier circuits supported by the exciter rotor, are alleviated through the implementation of the hub 100.

Further, because the hub 100 can be manufactured very accurately to within desired tolerances in terms of its physical size, the exciter rotor can be manufactured to have desired axial thickness and other size characteristics. Additionally, because the laminations 210 are shrunk fit about the hub 100 and because the hub occupies most of the radial distance between the shaft 615 and the outer circumference of the exciter rotor, it is also easier to manufacture the exciter rotor so that the positions of the laminations are within tolerances. Further, through the use of the hub 100, it is easier to provide support for the rectifier circuits 620a–c as well as, through the use of the holes 180, easier to provide lubricant/coolant to the rectifier circuits. Additionally, because the laminations are now in the shapes of rings with relatively narrow radial widths, it is easier to manufacture laminations within tolerances. Finally, by filling in certain of the holes 170 on the retaining rim 160 and the balancing ring 240, it is easier to properly balance the exciter rotor 400.

Typically, the balancing process can take two steps, a first step in which certain of the holes 170 of both the retaining rim 160 and the balancing ring 240 are filled to balance the exciter rotor 400 by itself, and also a second step of filling in various holes of just the retaining rim 160 once the exciter rotor 400 is positioned and shrunk fit onto the shaft 615 in order to provide proper balancing to the overall rotor assembly 600.

Thus, while the invention has been described with reference to a preferred embodiment, it will be understood by those skilled in the art that various changes may be made and equivalents may be substituted for elements thereof without departing from the scope of the invention. In addition, many modifications may be made to adapt the teachings of the invention to a particular situation without departing from the essential scope thereof. For example, a hub such as the hub 100 can be adapted also for implementation on other types of rotors or elements of rotational machines including motors as well as generators. Therefore, it is intended that the invention not be limited to the particular embodiment disclosed as the best mode contemplated for carrying out this invention, but that the invention will include all embodiments falling within the scope of the appended claims.

We claim:

1. A method of constructing a rotor, the method comprising:
    providing a hub having an outer structure with a cylindrical support surface and a retaining ring, an inner structure forming a cylindrical cavity, and an intermediate structure coupled to the inner structure and the outer structure and configured to support the inner and outer structures relative to one another;
    positioning a plurality of ring-type laminations and a pair of insulating rings onto the cylindrical support surface, wherein a first of the pair of insulating rings is positioned on a first side of the plurality of laminations and a second of the pair of insulating rings is positioned on a second side of the plurality of laminations, wherein the laminations and insulating rings are positioned so that the first of the pair of insulating rings abuts the retaining ring;
    shrink-fitting the ring-type laminations and insulating rings onto the cylindrical support surface;
    positioning a balancing ring onto the cylindrical supports surface so that the balancing ring abuts the second of the pair of insulating rings;
    shrink-fitting the balancing ring onto the cylindrical support surface; and
    wrapping a plurality of wire windings onto the laminations;
    providing a plurality of fluid channels within the hub;
    coupling a plurality of contact pads and bolts to the retaining ring;
    coupling end wire terminals of the wire windings to the bolts;
    positioning rectifier circuits onto the contact pads, wherein the rectifier circuits extend axially through cavities within the hub and are positioned proximate orifices of the channels so that fluid is sprayed toward the rectifier circuits; and
    shrink-fitting the hub onto a shaft.

2. A method of constructing a rotor, the method comprising:
    providing a hub having an outer structure with a cylindrical support surface and a retaining ring, an inner structure forming a cylindrical cavity, and an intermediate structure coupled to the inner structure and the outer structure and configured to support the inner and outer structures relative to one another;
    positioning a plurality of ring-type laminations and a pair of insulating rings onto the cylindrical support surface, wherein a first of the pair of insulating rings is positioned on a first side of the plurality of laminations and a second of the pair of insulating rings is positioned on a second side of the plurality of laminations, wherein the laminations and insulating rings are positioned so that the first of the pair of insulating rings abuts the retaining ring;
    shrink-fitting the ring-type laminations and insulating rings onto the cylindrical support surface;
    positioning a balancing ring onto the cylindrical supports surface so that the balancing ring abuts the second of the pair of insulating rings;
    shrink-fitting the balancing ring onto the cylindrical support surface; and
    wrapping a plurality of wire windings onto the laminations;
    positioning slot insulation portions within cut-outs in the laminations;
    positioning first and second insulating bands respectively around the retaining ring and the balancing ring;
    after wrapping the plurality of wire windings onto the laminations, positioning third and fourth insulating bands around end turns of the wire windings, wherein the third insulating band is around end turns that surround the retaining ring, and wherein the fourth insulating band is around end turns that surround the balancing ring;
    positioning additional slot insulation portions in the cut-outs in the laminations above the wire windings proximate an outer circumference of the laminations; and
    positioning retaining rings around the third and fourth insulating bands.

* * * * *